United States Patent
Chen et al.

(10) Patent No.: US 10,200,901 B2
(45) Date of Patent: Feb. 5, 2019

(54) ANOMALY DETECTION BASED ON PERFORMANCE INDICATORS

(71) Applicant: ARRIS Enterprises, LLC, Suwanee, GA (US)

(72) Inventors: Jiayi Chen, Singapore (SG); Lakshmi Nagarajan, Singapore (SG); See Ho Ting, Singapore (SG); Yang Han, Singapore (SG)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 15/884,340

(22) Filed: Jan. 30, 2018

(65) Prior Publication Data

US 2018/0220314 A1 Aug. 2, 2018

(30) Foreign Application Priority Data

Jan. 31, 2017 (SG) .............................. 10201700756P

(51) Int. Cl.
*H04W 24/00* (2009.01)
*H04W 24/08* (2009.01)
*H04W 24/04* (2009.01)

(52) U.S. Cl.
CPC .......... *H04W 24/08* (2013.01); *H04W 24/04* (2013.01)

(58) Field of Classification Search
CPC ....... H04W 24/02; H04W 24/00; H04W 4/02; H04W 88/08; H04W 24/08; H04W 40/20; H04W 4/04
See application file for complete search history.

(56) References Cited

U.S. PATENT DOCUMENTS

| 2014/0099978 A1* | 4/2014 | Egner | H04W 28/26 455/456.6 |
| 2016/0205596 A1* | 7/2016 | Yao | H04W 36/0083 370/329 |
| 2016/0285700 A1* | 9/2016 | Gopalakrishnan | G06N 7/005 |
| 2017/0127303 A1* | 5/2017 | Austin | H04W 24/04 |

* cited by examiner

*Primary Examiner* — Khalid Shaheed
(74) *Attorney, Agent, or Firm* — Stewart M. Wiener; Steven E. Stupp

(57) ABSTRACT

During operation, a computer may monitor values of at least one performance metric associated with packet communication by access points in a network. Then, the computer may compare current values of the performance metric for the access points with historical values of the performance metric for the access points within a temporal context in order to determine temporal anomaly scores for the access points. Moreover, the computer may compare the temporal anomaly scores of a group of access points in order to determine spatial temporal anomaly scores for the access points that indicate a significance of the temporal anomaly scores in a spatial context. Furthermore, when a spatial temporal anomaly score for an access point meets a detection criterion, the computer system may identify the current value of the performance metric for the access point as an anomaly. Next, the computer system may perform a remedial action based on the identified anomaly.

20 Claims, 10 Drawing Sheets

ANOMALY DETECTION BASED ON PERFORMANCE INDICATORS

CROSS REFERENCE TO RELATED APPLICATIONS

This application claims priority under 35 U.S.C. 120 as a Continuation of Singapore patent application Ser. No. 10201700756P, filed Jan. 31, 2017, the contents of which are herein incorporated by reference.

BACKGROUND

Field

The described embodiments relate to techniques for communicating information among electronic devices. In particular, the described embodiments relate to techniques for detecting anomalies based on access-point performance indicators.

Related Art

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

For example, many electronic devices communicate with each other via wireless local area networks (WLANs) using an IEEE 802.11-compatible communication protocol (which are sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

Wi-Fi has emerged as one of the cornerstone technologies of the mobile Internet, and the scale of Wi-Fi networks continues to increase. In the near future, carrier-class Wi-Fi networks are expected to contain several hundred thousand access points.

While large-scale Wi-Fi networks are popular because of their reduced cost, and increased coverage, and capacity, managing and maintaining such large networks can be challenging. One approach for addressing this challenge is anomaly detection, which refers to techniques of finding pattern-breaking data points that deviate from or do not conform with their expected values. As in other complex systems, anomalous samples of a certain key performance indicators for access points (such as received signal strength, client counts, session length, traffic, etc.) in a Wi-Fi network can indicate significant functional issues of the network.

However, anomaly detection techniques are usually plagued by false positives or false alarms. For example, given the dynamic and ad-hoc nature of Wi-Fi networks, many anomaly detection techniques cannot accurately detect anomalies. The incorrect anomaly detections can result in significant expense and reduced communication performance in large Wi-Fi networks, which can be frustrating to operators and can degrade the user experience of users of these networks.

SUMMARY

The described embodiments relate to a computer that includes an interface circuit that communicates with access points in a network. During operation, the computer monitors values of at least one performance metric associated with packet communication by the access points. Then, the computer compares current values of the performance metric for the access points with historical values of the performance metric for the access points within a temporal context in order to determine temporal anomaly scores for the access points. Moreover, the computer compares the temporal anomaly scores of a group of access points in order to determine spatial temporal anomaly scores for the access points that indicate a significance of the temporal anomaly scores in a spatial context. Furthermore, when a spatial temporal anomaly score for an access point meets a detection criterion, the computer system identifies the current value of the performance metric for the access point as an anomaly. Next, the computer system performs a remedial action based on the identified anomaly.

Note that the performance metric may include: a received signal strength (RSSI), a throughput, and/or a packet error rate.

Moreover, the temporal context may include: a target time, a time interval, and/or a sequence of time intervals.

Furthermore, the group of access points may include access points that: have environments with a common characteristic, are geographically proximate to each other, or have approximately the same response to a change in an environmental factor.

Additionally, prior to comparing the temporal anomaly scores of the group of access points, the computer may identify the group of access points using an unsupervised learning technique. For example, the unsupervised learning technique may include k-means.

In some embodiments, the remedial action includes: providing a notification associated with the anomaly, updating firmware of the access point, rebooting the access point, and/or providing another type of feedback to the access point.

Note that comparing a current value of the performance metric for a given access point with the historical values of the performance metric of the given access point may involve: computing a logarithm of a ratio of the current value of the performance metric for the given access point with the historical values of the performance metric of the access point, determining a p-value of the current value of the performance metric for the given access point based on the historical values of the performance metric of the access point, and/or determining a confidence interval of the current value of the performance metric for the given access point based on the historical values of the performance metric of the access point.

Moreover, the performance metric may be based on a set of measurements and a statistical analysis technique, such as: a median, a mean, a histogram and/or a kernel-based statistical analysis technique.

Furthermore, comparing the current values of the performance metric for the access points with the historical values of the performance metric for the access points within the temporal context may involve comparing the current values of the performance metric with a repetitive variation of the historical values of the performance metric as a function of time.

Additionally, the computer may include: a processor; and a memory, coupled to the processor, which stores a program module that, during operation, is executed by the processor. The program module may include instructions for at least some of the operations performed by the computer.

Another embodiment provides a readable storage medium for use with the computer. When executed by the computer, this readable storage medium includes causes the computer to perform at least some of the aforementioned operations.

Another embodiment provides a method, which may be performed by the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A computer that detects anomalies in a network with multiple access points is described. During operation, this computer may monitor values of at least one performance metric associated with packet communication by the access points. Then, the computer may compare current values of the performance metric for the access points with historical values of the performance metric for the access points within a temporal context in order to determine temporal anomaly scores for the access points. Moreover, the computer may compare the temporal anomaly scores of a group of access points in order to determine spatial temporal anomaly scores for the access points that indicate a significance of the temporal anomaly scores in a spatial context. Furthermore, when a spatial temporal anomaly score for an access point meets a detection criterion, the computer system may identify the current value of the performance metric for the access point as an anomaly. Next, the computer system may perform a remedial action based on the identified anomaly.

By evaluating the values of the performance metric in the temporal and spatial contexts, this detection technique may accurately identify anomalies that cannot be explained by normal system dynamics (i.e., with a reduced or eliminated false-positive or false-alert rate). Therefore, the detection technique may enable operators of the network to perform the appropriate remedial action in a timely manner. This may improve the communication performance of the network, while reducing the cost of maintaining the network. Consequently, the detection technique may improve the user experience of the operators and users of the networks.

In the discussion that follows, electronic devices and the access points communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in the network using a wired communication protocol, such as an IEEE 802.3 standard (which is sometimes referred to as 'Ethernet') and/or another type of wired interface. In the discussion that follows, Ethernet is used as an illustrative example.

Figure 1:
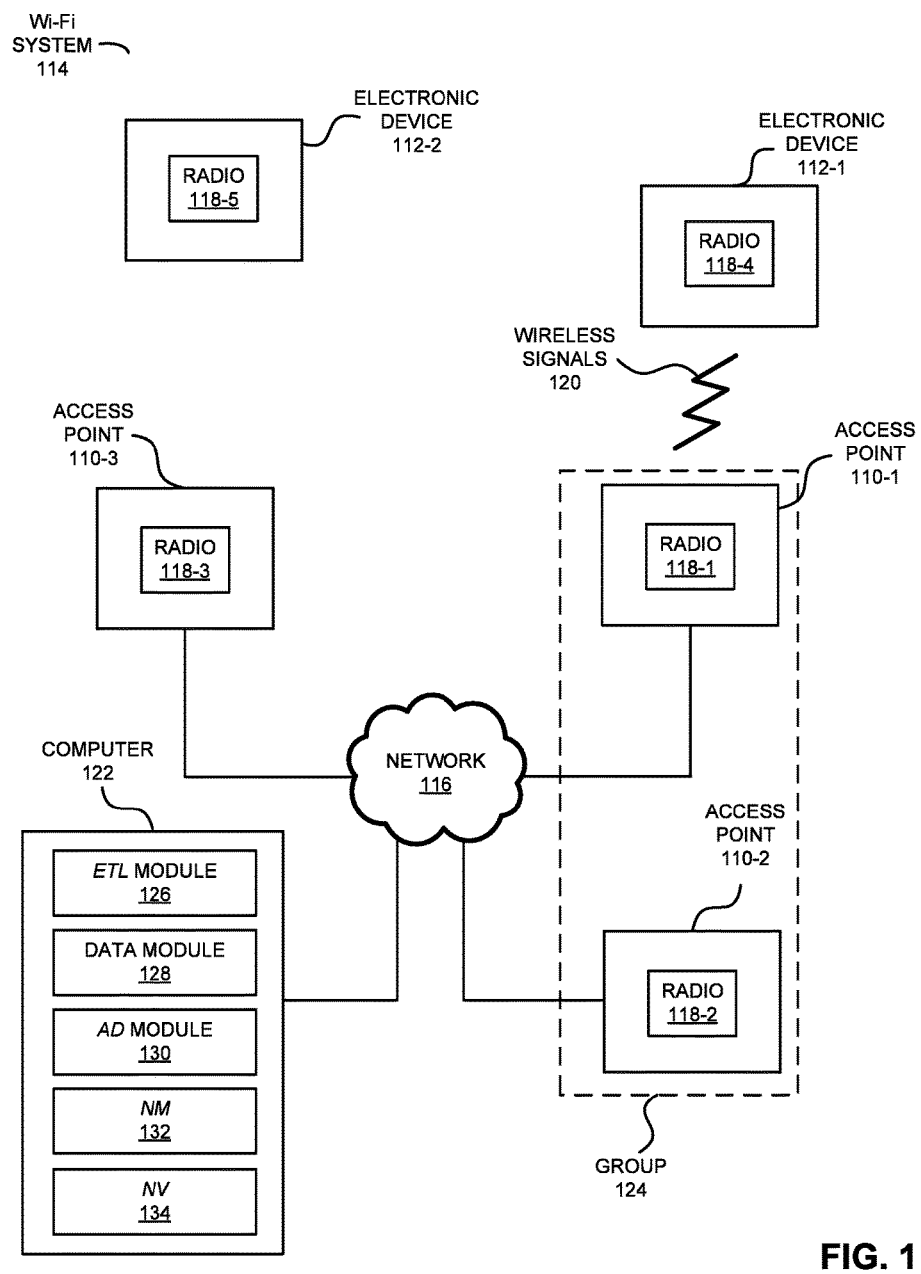
FIG. 1 is a block diagram illustrating communication among access points and electronic devices in a network in accordance with an embodiment of the present disclosure.

FIG. 1 presents a block diagram illustrating an example of communication among one or more access points 110 and electronic devices 112 (such as a cellular telephone) in a large-scale Wi-Fi system 114 in accordance with some embodiments. In particular, access points 110 may communicate with each other using wireless and/or wired communication. Note that access points 110 may include a physical access point and/or a virtual access point that is implemented in software in an environment of an electronic device or a computer. In addition, at least some of access points 110 may communicate with electronic devices 112 using wireless communication.

The wired communication in Wi-Fi system 114 may occur via network 116 (such as an intra-net, a mesh network, point-to-point connections and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wireless communication among access points 110 also involves the use of dedicated connections, such as via a peer-to-peer (P2P) communication technique.

As described further below with reference to FIG. 11, access points 110 and/or electronic devices 112 may include subsystems, such as a networking subsystem, a memory subsystem and a processor subsystem. In addition, access points 110 and electronic devices 112 may include radios 118 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 118 are shown in access points 110 and electronic devices 112, one or more of these instances may be different from the other instances of radios 118.

As can be seen in FIG. 1, wireless signals 120 (represented by a jagged line) are transmitted from radio 118-1 in access point 110-1. These wireless signals may be received by radio 118-4 in electronic device 112-1. In particular, access point 110-1 may transmit packets. In turn, these packets may be received by electronic device 112-1.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving wireless signals 120 with the packet or frame; decoding/extracting the packet or frame from received wireless signals 120 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, it can be expensive and complicated to detect anomalies in Wi-Fi system 114. As described further below with reference to FIGS. 2-10, a local or a remotely located computer 122 (which may be separate from or may be included in a controller associated with access points 110) may implement the detection technique. In particular, computer 122 may, via network 116, monitor values of at least one performance metric associated with communication by access points 110, such as communication of frames or packets (which is sometimes referred to as 'packet communication'). Note that the performance metric may include: an RSSI, a throughput, and/or a packet error rate. In some embodiments, the performance metric is based on a set of measurements and a statistical analysis technique, such as: a median, a mean, a histogram and/or a kernel-based statistical analysis technique.

Then, computer 122 may compare current values of the performance metric for access points 110 with historical values of the performance metric for access points 110 within a temporal context in order to determine temporal anomaly scores for access points 110. For example, the temporal context may include: a target time, a time interval, and/or a sequence of time intervals. Note that comparing a current value of the performance metric for a particular access point with the historical values of the performance metric of the access point may involve: computing a logarithm of a ratio of the current value of the performance metric for the access point with the historical values of the performance metric of the access point, determining a p-value of the current value of the performance metric for the access point based on the historical values of the performance metric of the access point, and/or determining a confidence interval of the current value of the performance metric for the access point based on the historical values of the performance metric of the access point. In some embodiments, comparing the current values of the performance metric for access points 110 with the historical values of the performance metric for access points 110 within the temporal context involves comparing the current values of the performance metric with a repetitive variation of the historical values of the performance metric as a function of time.

Moreover, computer 122 may compare the temporal anomaly scores of a group 124 of access points 110 (such as access points 110-1 and 110-2) in order to determine spatial temporal anomaly scores for access points 110-1 and 110-2 that indicate a significance of the temporal anomaly scores in a spatial context. Note that group 124 may include access points that: have environments with a common characteristic, are geographically proximate to each other, and/or have approximately the same response to a change in an environmental factor. In some embodiments, prior to comparing the temporal anomaly scores of group 124, computer 122 may identify group 124 using an unsupervised learning technique, such as k-means, a mixture model, hierarchical clustering or another clustering technique. However, these examples are nonlimiting, and a wide variety of unsupervised learning techniques may be used.

Furthermore, when a spatial temporal anomaly score for an access point (such as access point 110-1) meets a detection criterion, computer system 122 may identify the current value of the performance metric for access point 110-1 as an anomaly. Next, computer system 122 may performs a remedial action based on the identified anomaly. For example, the remedial action may include: providing a notification associated with the anomaly (such as display the notification to an operator), updating firmware of access point 110-1, rebooting access point 110-1, and/or providing another type of feedback to access point 110-1 (such as scheduling maintenance or replacement of access point 110-1).

In this way, computer 122 may accurately identify anomalies in Wi-Fi system 114, thereby reducing maintenance costs and improving the communication performance in Wi-Fi system 114.

Figure 2:
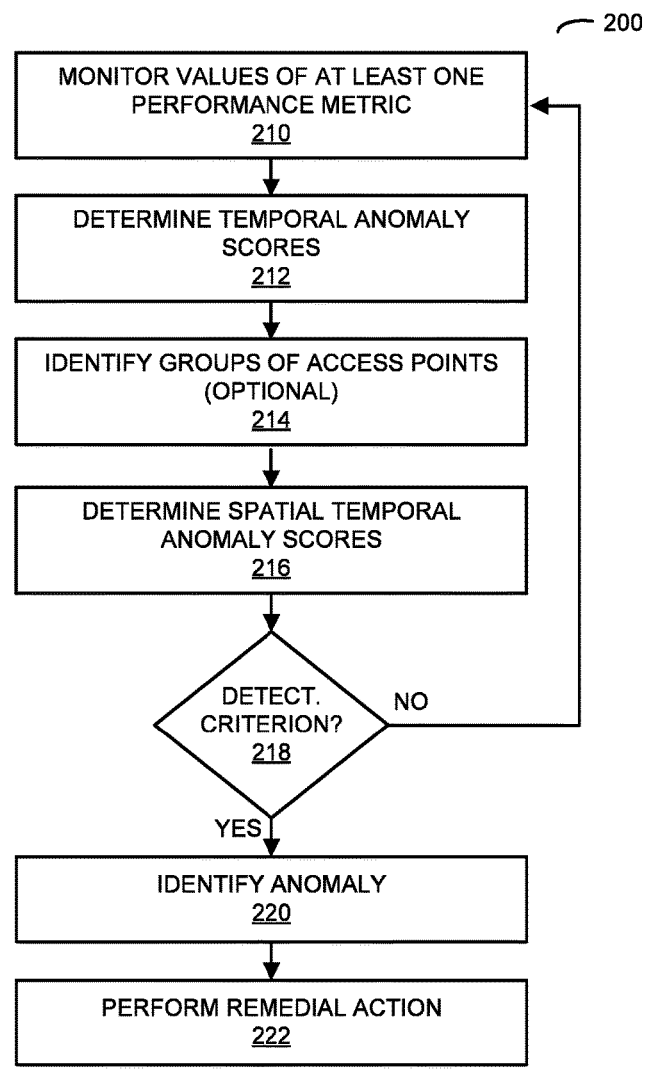
FIG. 2 is a flow diagram illustrating a method for identifying an anomaly using a computer in FIG. 1 in accordance with an embodiment of the present disclosure.

We now describe embodiments of the method. FIG. 2 presents a flow diagram illustrating an example of a method 200 for identifying an anomaly using a computer, such as computer 122 in FIG. 1. During operation, the computer may monitor values of at least one performance metric (operation 210) associated with packet communication by the access points.

Then, the computer may compare current values of the performance metric for the access points with historical values of the performance metric for the access points within a temporal context in order to determine temporal anomaly scores (operation 212) for the access points. Moreover, the computer may compare the temporal anomaly scores of a group of access points in order to determine spatial temporal anomaly scores (operation 216) for the access points that indicate a significance of the temporal anomaly scores in a spatial context.

When a spatial temporal anomaly score for an access point meets a detection criterion (operation 218), the computer may identify the current value of the performance metric for the access point as an anomaly (operation 220). Otherwise (operation 218), the computer may repeat the monitoring (operation 210).

Next, the computer may perform a remedial action (operation 222) based on the identified anomaly.

In some embodiments, the computer performs one or more additional operations. For example, the computer may optionally identify the group of access points (operation 214) using an unsupervised learning technique.

In some embodiments of method 200, there may be additional or fewer operations. Furthermore, the order of the operations may be changed, and/or two or more operations may be combined into a single operation.

Figure 3:
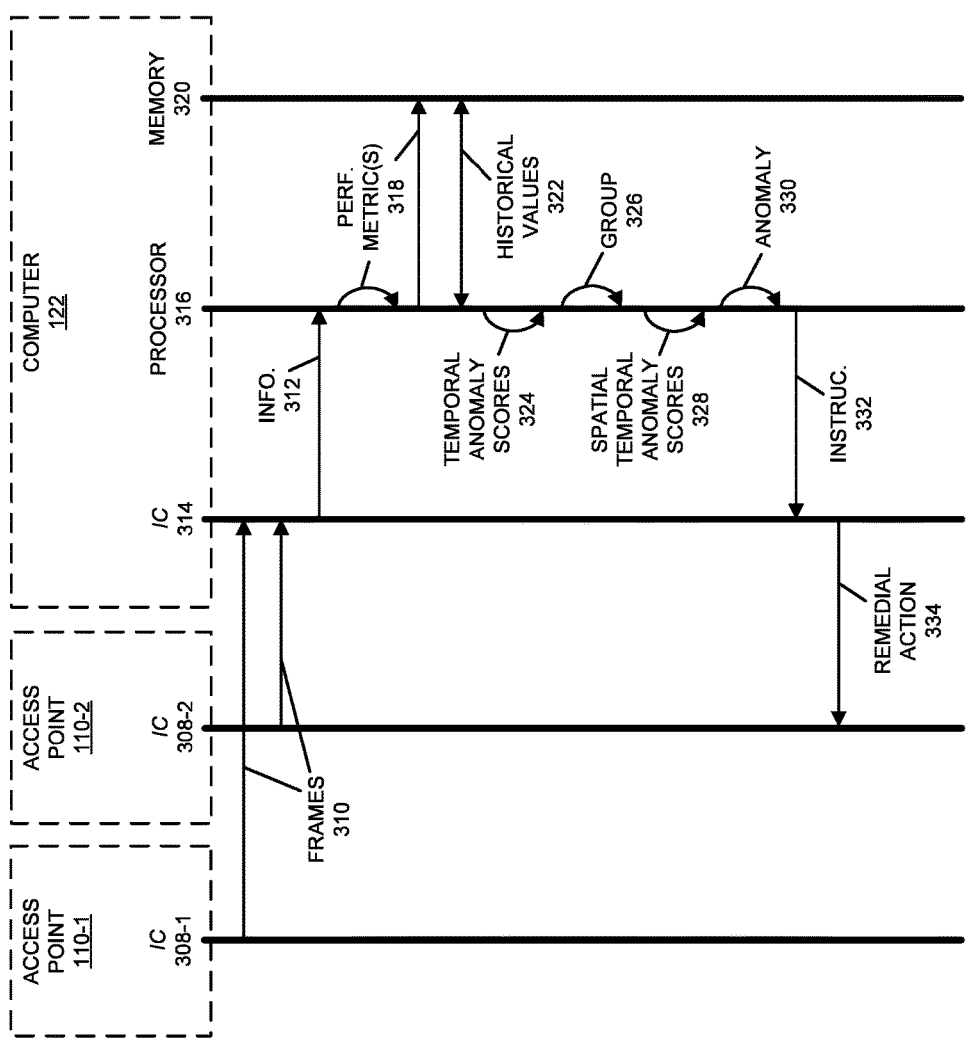
FIG. 3 is a drawing illustrating communication among the electronic devices in FIG. 1 in accordance with an embodiment of the present disclosure.

FIG. 3 presents a drawing illustrating an example of communication among access points 110 and computer 122. In particular, interface circuits (ICs) 308 in access points 110 may transmit frames 310 (or packets) with information 312 summarizing communication performance to computer 122. After receiving frames 310, interface circuit 314 in computer 122 may provide information 312 to processor 316. Then, processor 316 may calculate one or more performance metrics 318 based on information 312. For example, processor 316 may use a statistical technique (such as a median, a mean, a histogram and/or a kernel-based statistical analysis technique) to calculate the one or more performance metrics 318 based on information 312. Moreover, processor 316 may store values of the one or more performance metrics 318 associated with the communication by access points 110 in memory 320.

Then, processor 316 may compare current values of the one or more performance metrics 318 for access points 110 with historical values 322 of the one or more performance metrics 318 for access points 110 within a temporal context in order to determine temporal anomaly scores 324 for access points 110.

Moreover, processor 316 may optionally identify a group 326 of access points using an unsupervised learning technique. For example, processor 316 may identify group 326 using a clustering technique.

Next, processor 316 may compare temporal anomaly scores 324 of group 326 in order to determine spatial temporal anomaly scores 328 for the access points in group 326 that indicate a significance of the temporal anomaly scores 324 in a spatial context.

When a spatial temporal anomaly score for an access point (such as access point 110-1) meets a detection criterion, processor 316 may identify the current value of the performance metric for access point 110-1 as an anomaly 330.

Furthermore, processor 316 may instruct 332 interface circuit 314 to perform a remedial action 334 based on the identified anomaly 330. For example, interface circuit 314 may provide: a notification associated with the anomaly 330, updated firmware to access point 110-1, instructions to reboot to access point 110-1, etc.

In some embodiments, the detection technique may be used to detect anomalous values of key performance indicators (KPIs) of access points in large-scale Wi-Fi networks. Because of the dynamic and ad-hoc nature of these wireless networks, the detection technique may consider the temporal and spatial contexts of the target access-point KPI samples. Consequently, the detection technique may efficiently provide a high probability of detection and a low probability of a false alarm.

As noted previously, managing large-scale Wi-Fi networks can be challenging. For example, it is typically useful for network administrators or operators to be able to identify and handle network issues such as: a particular access point starts dropping its clients frequently, access points at a particular location are experiencing severe interference, a particular group of access points gets overloaded frequently, etc. However, given the size and ad-hoc nature of Wi-Fi networks, it can be difficult to obtain such insights in a timely manner.

One approach to these challenges is anomaly detection. During anomaly detection, pattern-breaking data points that do not conform to their expected values are identified. As in other complex systems, anomalous samples of KPIs from a particular access point (e.g., RSSI, client counts, session length, traffic, etc.) may indicate significant functional issues in a Wi-Fi network. Therefore, performing continuous, periodic or as-needed monitoring and anomaly detection for various access-point KPIs can be used to ensure that a large-scale Wi-Fi network is operating optimally.

The input data in an anomaly detection technique may be a collection of samples of one or more target measurements. The objective of the anomaly detection technique may be to define a boundary that separates the normal and abnormal values of the target measurement(s), so that each of the input data samples can be marked as normal/abnormal according to its position with respect to the derived boundary.

However, there are often challenges in implementing an anomaly detection technique. In particular, defining the boundary between normal and abnormal values is often difficult. This is especially true when the dimensionality of the date samples becomes large. Moreover, large amounts of high-quality labeled data for training/validating models are usually unavailable. This is often because of: the prohibitive labor cost involved in collecting labeled data manually; and the abnormal values often occur at a much lower frequency than the normal ones, which can make it difficult to collect enough abnormal data samples. In this regard, an unsupervised anomaly detection technique that does not require labeled data may have an advantage over a corresponding supervised anomaly detection technique. Furthermore, noise in the network may corrupt the input data, such that some abnormal data samples are very similar to the normal ones, and vice versa. This may result in miss detections and/or false alarms in the anomaly detection process.

Figure 4:
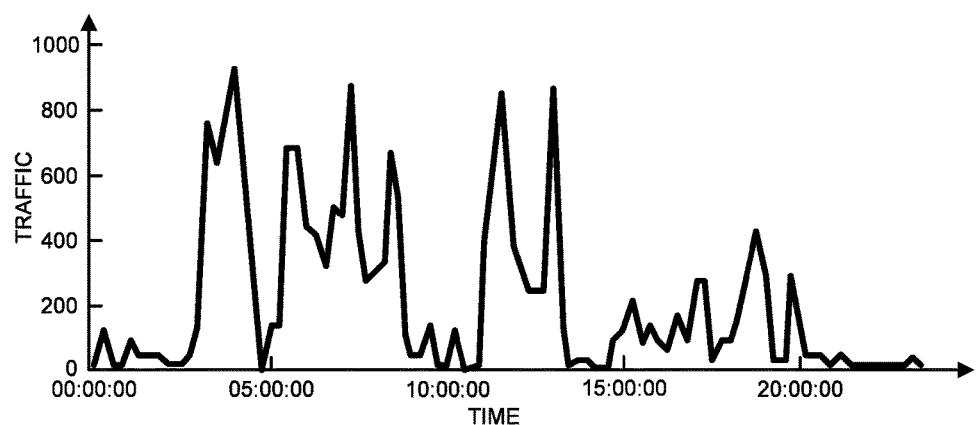
FIG. 4 is a drawing illustrating traffic as a function of time for an access point in FIG. 1 in accordance with an embodiment of the present disclosure.
Figure 5:
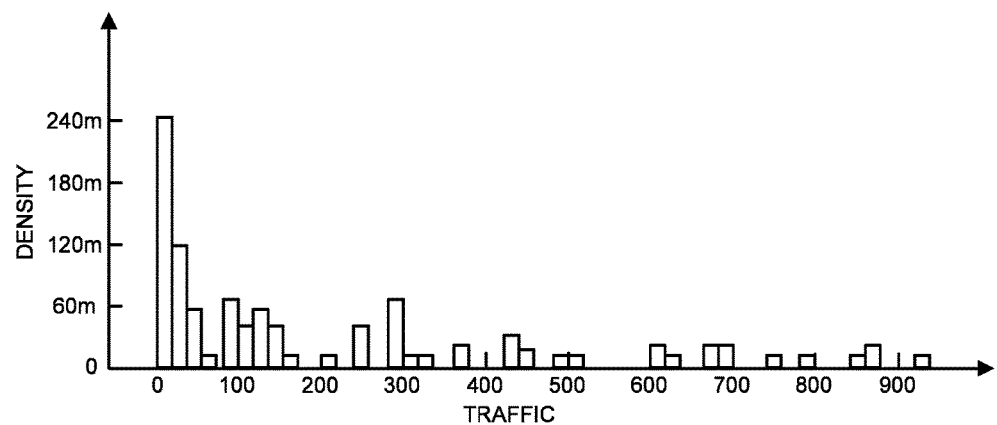
FIG. 5 is a drawing illustrating a histogram of traffic for an access point in FIG. 1 in accordance with an embodiment of the present disclosure.

In addition, the unique characteristics of Wi-Fi networks usually poses additional challenges. For example, many access-point KPIs may have a wide dynamic range and a flattened and long-tailed histogram, which can make it difficult to identify anomalies from a statistic point of view. FIG. 4 presents a drawing illustrating an example of traffic as a function of time on a particular day for one of access points 110 in FIG. 1. In this example, there is a wide dynamic range (0 to 900) in the traffic. Moreover, as shown in FIG. 5, which presents a drawing illustrating an example of a histogram of traffic for one of access points 110 in FIG. 1, the traffic patterns in FIG. 4 are relatively evenly distributed across the whole dynamic range. Consequently, it may be difficult to find a threshold that is can be used to determine whether a given traffic value is anomalous.

Furthermore, many access-point KPIs can vary significantly depending on timing and various environmental factors. This may affect the anomaly detection in several ways. In particular, an access-point KPI sample that is considered perfectly normal at one time point may become an anomaly at another time point. For example, high-data traffic for a particular access point during operation hours in a subway station is expected, but the same high traffic should be flagged as anomalous after the operation hours.

Additionally, an access-point KPI sample collected from a particular access point may be considered as normal, while the same KPI sample may be considered as anomalous if it is collected from another access point in a different environment. For example, while a Wi-Fi session may last up to a few hours from an access point in an office, if the same observation is made for an access point on a subway platform (where people are not supposed to linger more than 10 minutes), it is likely anomalous.

Note that extreme values or drastic changes of the target access-point KPIs do not necessarily constitute an anomaly. This is because these access-point KPIs may be normal reflections of changes of the environmental factors and may not lead to functional issue in the Wi-Fi network. For example, a significant increase of data traffic for a particular access point may be expected when the associated users start using certain data-heavy applications, such as high-definition video streaming. In this case, the drastic increasing of the traffic should not be marked as an anomaly.

Consequently, in Wi-Fi networks, the anomaly detection technique may be used to identify the anomalous values of the target access-point KPIs that cannot be explained by the normal dynamics of the system. To facilitate this capability, the anomaly detection technique may keep the relevant timing and environmental contexts in mind when identifying anomalies based on access-point KPIs in order to reduce or minimizing the probability of miss detection and/or false alarm.

Figure 6:
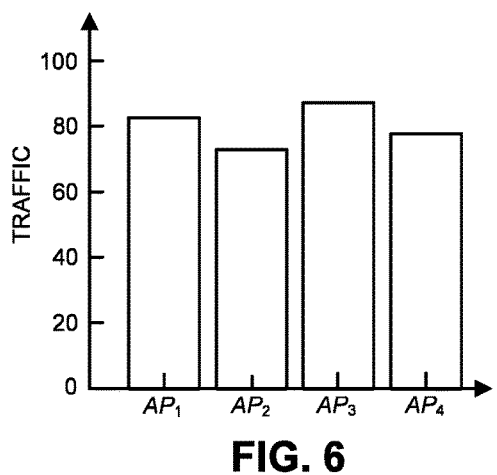
FIG. 6 is a drawing illustrating traffic for different access points in FIG. 1 in accordance with an embodiment of the present disclosure.

For example, assume access point 1 ($AP_1$), access point 2 ($AP_2$), access point 3 ($AP_3$) and access point 4 ($AP_4$) belong to the same Wi-Fi network. FIG. 6 presents a drawing illustrating traffic on day X for these access points. In this example, the objective is to detect if the traffic of $AP_1$ is anomalous on day X. However, as shown in FIG. 6, the traffic of all the access points are similar on day X, so an anomaly cannot be detected by simply comparing them.

Figure 7:
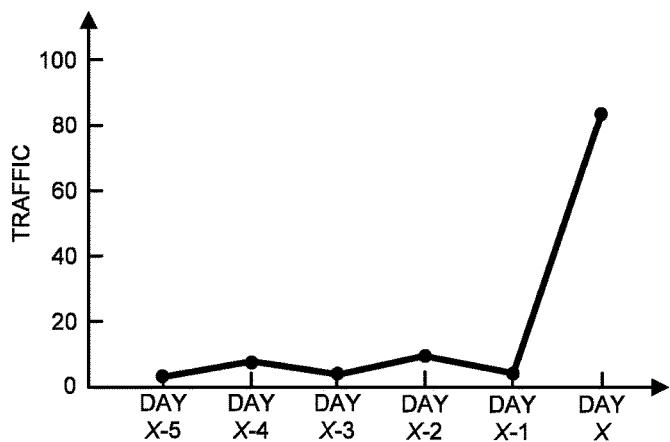
FIG. 7 is a drawing illustrating traffic on different days for an access point in FIG. 1 in accordance with an embodiment of the present disclosure.

Instead, the historical traffic of $AP_1$ may need to be considered in order to fully evaluate its value on day X. This is shown in FIG. 7, which presents a drawing illustrating traffic on six consecutive days (X−5 to X) for $AP_1$. As shown in FIG. 7, the historical traffic of $AP_1$ indicates a range of 'normal' values of (0, 8). Therefore, the traffic increase to over 80 (over 10× its normal value) on day X strongly suggests anomalous behavior that would not be detected without considering the timing or temporal context of the traffic measurement.

Even though the anomalous behavior of the traffic of $AP_1$ has been identified in the temporal context, is the traffic of $AP_1$ on day X an anomaly? No. The anomalous behavior as a function of time may only indicate a deviation of the target measurement from its historical 'normal' value. This deviation may be caused by changes in one or more environmental factors. In order to identify true anomalies that cannot be explained by normal system dynamics, the degree and probability of anomalous temporal behaviors may need to be considered.

Figure 8:
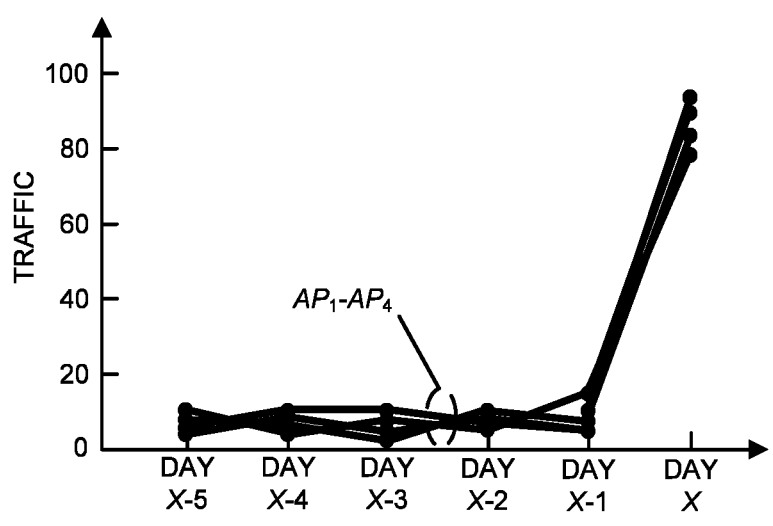
FIG. 8 is a drawing illustrating traffic on different days for access points in FIG. 1 in accordance with an embodiment of the present disclosure.

FIG. 8 presents a drawing illustrating traffic on six consecutive days (X−5 to X) for $AP_1$-$AP_4$. Based on FIG. 8, it is clear that all of the access points have increases in their traffic by approximately 10× on day X, which could be the result of an occasional change of the network usage pattern, e.g., a large group of ad-hoc users may access the network on day X. In the context of the peer access points, the traffic of $AP_1$ behaves as expected on day X. Therefore, an anomaly should not be detected.

Based on the preceding examples, the detection technique may use an unsupervised learning technique that includes or considers the timing and the environmental factors of the target access-point KPIs. In the discussion of the detection technique, note that a target access point may be the access point whose operation status is of interest. Moreover, the target access-point KPI may be the KPI of the target access point whose anomalous values are of interest, and the target access-point KPI sample may be the sample of the target access-point KPI on which the anomaly detection is performed. Furthermore, the target time instant may be the time point when the target access-point KPI sample is collected.

Additionally, the temporal context may be a logic time or time window within which the values of the samples of the target access-point KPI are similar to that of the target access-point KPI sample. Note that the temporal context of the target access-point KPI sample may include the target time instant, which may or may not be a continuous time range. Instead, the temporal context may include a collection or a sequence of discrete time ranges, such as 'from 8:00 to 9:00 am on every Tuesday for the previous month.' The temporal context may be used to define how the target access-point KPI usually or typically behaves. Therefore, the temporal context may be used to determine if an anomaly occurs in a temporal perspective.

Moreover, the spatial context may be a logic group of access points whose members are affected by environmental factors that are similar to those of the target access point. These environmental factors may include, but are not limited to, one or more characteristics of: the deployed environment, the network infrastructure, the dynamics of the network usage, the types of the client devices, etc. Note that the spatial context of the target access-point KPI sample may include the target access point and access points that are deployed in the geographic vicinity of or proximate to the target access point (such as access points in the same building, the same town, the same radio-frequency environment, etc.). In general, access points may be assigned to a spatial context because that they usually operate under similar environmental factors. However, in general, the spatial context may not be determined solely based on geographical location. For example, it is possible that access points in two different buildings have similar environmental factors, and thus may be assigned to the same spatial context group. The spatial context may be used to define how the target KPI generally react to environment changes, and thus it can be used to determine if an anomaly occurs in a spatial (peer) perspective.

The proposed detection technique may be based on the assumption that under the temporal and spatial contexts, normal access-point KPI samples occur far more frequently than anomalous ones. This assumption may be a prerequisite for an unsupervised anomaly detection technique. In general, it may be valid in real-life Wi-Fi networks.

The following notations may be used in the next discussion. There is a Wi-Fi network with N access points, i.e., $AP_1, AP_2, \ldots AP_N$. Moreover, $m(AP_i, t_j)$ denotes a sample of the target access-point KPI that is collected from $AP_i$ at time instant $t_j$. Furthermore, the target access point is denoted as $AP_t$ and the target time instant is denoted as $t_t$. Additionally, the temporal and spatial contexts of the target sample $m(AP_t, t_t)$ are denoted as $T_t$ and $S_t$, respectively. Note that the objective of the detection technique is to determine if the target access-point KPI sample $m(AP_t, t_t)$ is an anomaly.

During the detection technique, for each $AP_i \in S_t$, a temporal benchmark (or performance metric) for $t_t$ may be calculated as $$b_{i,t} = \text{median}(m(AP_i, t_j) j \in T_t).$$

In some embodiments, the median function is used to calculate the temporal benchmark. However, this is an illustrative example and is not intended to be limiting. Consequently, a variety of statistical techniques may be used to represent the collective behavior of $m(AP_i, t_j)$, where $j \in T_t$. These include, but are not limited to: the mean, a histogram, a kernel-based technique, etc.

Then, for each $AP_i \in S_t$, a temporal anomaly score (TAS) may be calculated for $t_t$ as $$TAS_{i,t} = \left| \log_{10}\left( \frac{m(AP_i, t_t)}{b_{i,t}} \right) \right|,$$

where $TAS_{i,t}$ represents the degree of the deviation of $m(AP_i, t_t)$ from its temporal benchmark $b_{i,t}$. Note that the logarithm is used to ensure that the dynamic range of $TAS_{i,t}$ is relatively small, which may facilitate the use of the softmax or normalized exponential function. However, the absolute logarithm-ratio function is used for illustrative purposes, and a wide variety of functions that evaluate the 'distance' from $m(AP_i, t_t)$ and $b_{i,t}$ can be used to calculate $TAS_{i,t}$.

Next, the softmax function may be used to calculate a spatial temporal anomaly score (STAS) for $AP_t$ at time instant $t_t$ as $$STAS_{t,t} = \frac{\exp(TAS_{t,t})}{\sum_{i=1}^{|S_t|} \exp(TAS_{i,t})},$$

where $STAS_{t,t}$ represents the relative significance of $TAS_{t,t}$ as compared to the temporal anomaly scores of all other access points under its spatial context, i.e., $TAS_{i,t}$ $\forall AP_i \in S_t \setminus \{AP_t\}$.

Furthermore, $m(AP_t, t_t)$ may be identified as an anomaly if $$STAS_{t,t} > \eta \cdot \frac{1}{|S_t|},$$

where $\eta$ is a predetermined or predefined parameter that depends on the temporal stationarity of the target access-point KPI. For example, $\eta$ may be between 2 and 4.

Referring back to FIG. 1, computer 122 (which is sometimes referred to as an 'access-point KPI anomaly detection engine') may include: an extract-transform-load (ETL) module (or engine) 126, a data module (or engine) 128, an anomaly-detection (AD) module (or engine) 130, a network maintainer (NM) 132, and a notification-and-visualization (NV) module (or engine) 134. Extract-transform-load module 126 may receive, from access points in a Wi-Fi network, data reports that contain various access-point KPIs. The data reports may be compatible with a variety of different formats, including: comma-separated values, extensible markup language, JavaScript object notation, etc. Moreover, extract-transform-load module 126 may extract the target access-point KPI sample and then may transform them into a structured format that is convenient for further processing. Furthermore, extract-transform-load module 126 may send the target access-point KPI samples to data module 128 and anomaly-detection module 130.

Data module 128 may store the target access-point KPI samples received from extract-transform-load module 126. Moreover, data module 128 may send the relevant information of the temporal and spatial contexts of the target access-point KPI samples to the anomaly-detection module 130. Furthermore, data module 128 may store the anomaly-detection results (including any intermediate results) of the target access-point KPI sample received from anomaly-detection module 130.

Anomaly-detection module 130 may receive the target access-point KPI samples from extract-transform-load module 126 and the relevant context information from data module 128. Moreover, anomaly-detection module 130 may perform anomaly detection on the target access-point KPI samples. Furthermore, anomaly-detection module 130 may send the anomaly-detection results to data module 128 (including any intermediate results), network maintainer 132, and the notification-and-visualization module 134.

Network maintainer 132 may receive anomaly-detection results of the target access-point KPI samples from the anomaly-detection module 130. Moreover, network maintain 132 may attempt to resolve network issues identified by anomaly-detection module 130 by executing corresponding network-management commands, e.g., access-point rebooting, access-point firmware upgrading, access-point channel switching, user traffic throttling, etc. Thus, network maintainer 132 may perform one or more remedial actions in response to an identified anomaly.

Figure 9:
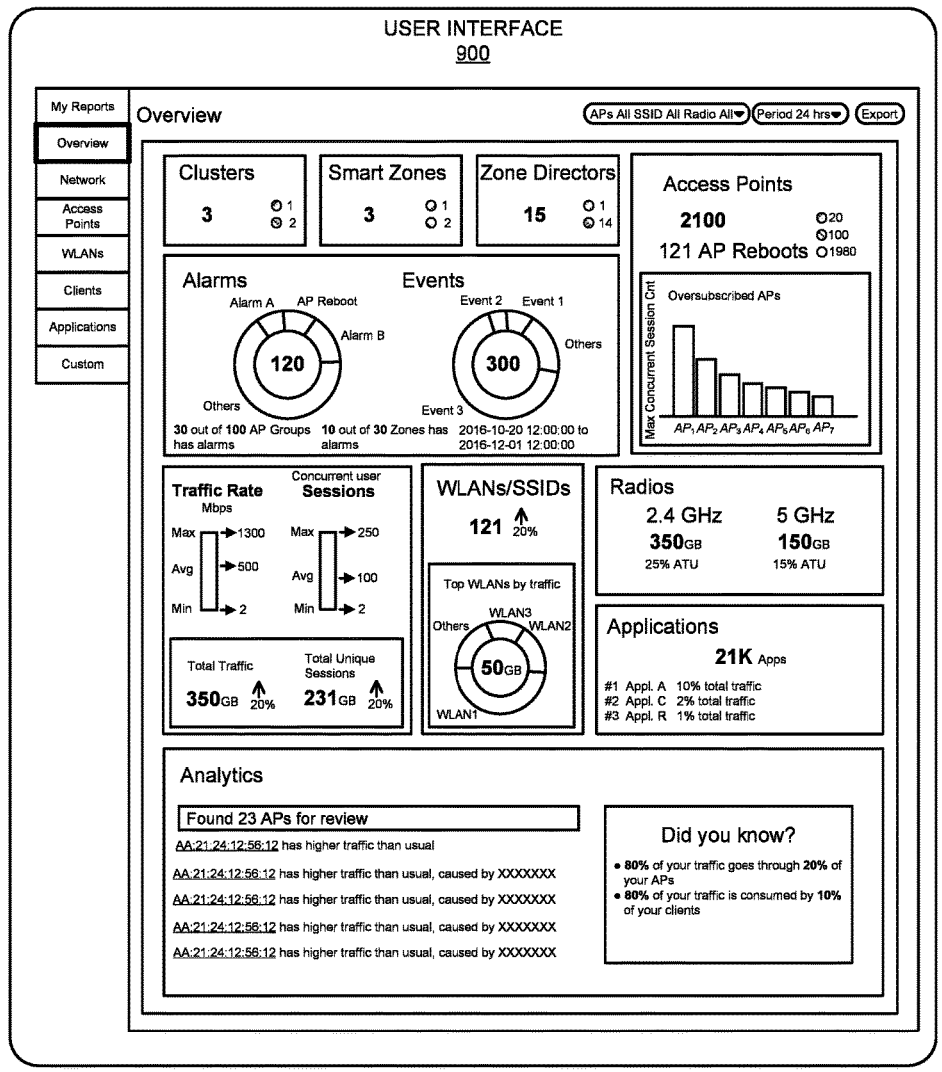
FIG. 9 presents a user interface with information associated with anomaly detection in accordance with an embodiment of the present disclosure.

Notification-and-visualization module 134 may receive anomaly detection results of the target access-point KPI samples from anomaly-detection module 130. Moreover, notification-and-visualization module 134 may generate notifications and visualization reports of the anomaly-detection results and may send them to user client for display. For example, FIG. 9 presents a user interface 900 on a display with information associated with anomaly detection. In particular, user interface 900 may summarize the operation of a Wi-Fi network, including detected or identified anomalies.

Figure 10:
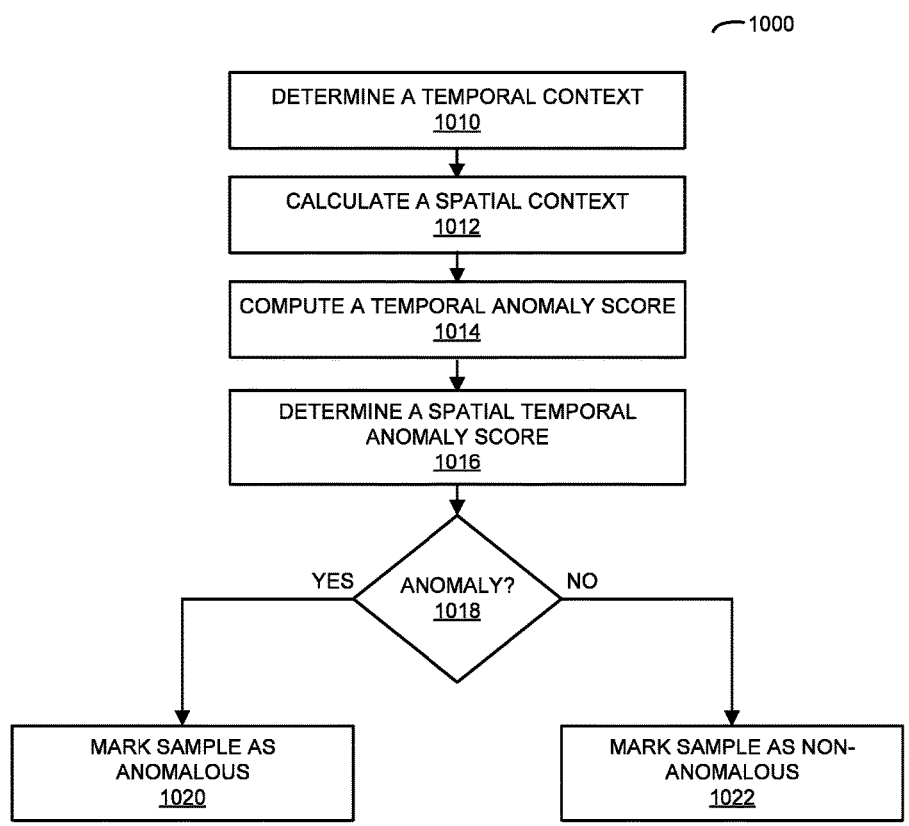
FIG. 10 is a flow diagram illustrating a method for identifying an anomaly using a computer in FIG. 1 in accordance with an embodiment of the present disclosure.

FIG. 10 presents a flow diagram illustrating a method 1000 for identifying an anomaly using a computer, such as computer 122 in FIG. 1. During this method, the computer may determine the temporal context (operation 1010) of the target access-point KPI sample by exploit the underlying seasonality or temporal variation of the target access-point KPI. Note that the seasonality of the target access-point KPI can be derived by analyzing a time series of the target access-point KPI samples using techniques such as spectral analysis and time-series decomposition.

If the underlying seasonality of the target access-point KPI exists, the temporal context of a target access-point KPI sample can be easily determined based on the position of the target time instant within a seasonal cycle. For example, assuming the target access-point KPI is the hourly traffic of a certain target access point, and a target access-point KPI sample is collected between 8:00 and 9:00 am on Friday of week X, then, if the target access-point KPI has a daily seasonality, the corresponding temporal context may be given as: 8:00-9:00 am on Friday of week X, 8:00-9:00 am on Thursday of week X, 8:00-9:00 am on Wednesday of week X, etc.

Alternatively, if the target access-point KPI has a weekly seasonality, the corresponding temporal context may be given as: 8:00-9:00 am on Friday of week X, 8:00-9:00 am on Friday of week X−1, 8:00-9:00 am on Friday of week X−2, etc. In either case, the first few time ranges (in reverse chronological order) that have an aggregated length up to W may be used as the temporal context. Note that W may be a predetermined or predefined parameter that depends on the temporal stationarity of the target access-point KPI. In particular, a larger value of W may be used to generate a stable temporal benchmark when the target access-point KPI has more erratic temporal fluctuations. For example, W may be 10× the period of the target access-point KPI, such as 10 hours for hourly traffic in the preceding example.

However, if the underlying seasonality of the target access-point KPI does not exist, a lookback window from the target time instant may be used as the temporal context. The length of the lookback window, i.e., W, is defined above.

Note that the underlying seasonality of the target access-point KPI may not, in general, be time-variant. Stated different, it may not be necessary to perform the seasonality analysis of the target access-point KPI for every target access-point KPI sample. Instead, a new seasonality analysis may be carried out only when significant changes happen to the underlying seasonality.

Then, the computer may calculate the spatial context (operation 1012). The spatial context of the target access-point KPI sample can be obtained by clustering the access points in the network based on their temporal anomaly scores within the temporal context of the target access-point KPI sample. Based on the clustering result, the group of access points that contains the target access point may be used as the spatial context of the target access-point KPI sample.

Figure 11:
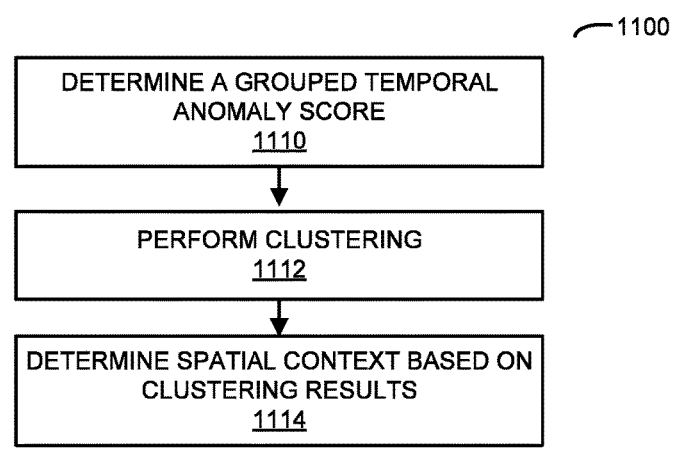
FIG. 11 is a flow diagram illustrating a method for determining a spatial context of performance values for access points using a computer in FIG. 1 in accordance with an embodiment of the present disclosure.

As shown in FIG. 11, which presents a flow diagram illustrating a method 1100 for determining a spatial context of performance values for access points, the computer may determine a grouped temporal anomaly score (operation 1110) for an $AP_i$ at time instant $t_r$. The grouped temporal anomaly score may be given as $GTAS_{i,t}=[TAS_{i,t1}, TAS_{i,t2}, \ldots TAS_{i,tq}]$, where $[t_1, t_2, \ldots t_q] \subset T_t \backslash \{t_t\}$. In particular, a technique may randomly selects q temporal anomaly scores of the $AP_i$ that are within the temporal context of the target access-point KPI sample (excluding $TAS_{i,t}$) to generate $GTAS_{i,t}$, where q may be a predetermined or predefined parameter that depends on the temporal stationarity of the target access-point KPI. For example, q may be between 3 and 10.

Then, the computer may perform clustering (operation 1112) on the $GTAS_{i,t}$ to classify the access points into K groups, i.e., $G_1, G_2, \ldots G_K$.

Moreover, the computer may use the clustering results to determine the spatial context (operation 1114). In general, the spatial context of the target access-point KPI sample $m(AP_t, t_t)$ may be the access-point group that $AP_t$ belongs to, i.e., $G_t$, where $G_t \in [G_1, G_2, \ldots G_K]$ Note that the temporal anomaly scores stored by the data module may be intermediate calculation results of previous instances of anomaly detection. When the number of stored temporal anomaly scores is less than q for a particular access point, the entire ensemble of access points in the network, i.e., $AP_1, AP_2, \ldots AP_N$, may be used as the spatial context of the target access-point KPI sample. In some embodiments, the groups of access pints that are deployed in the vicinity of the target access point are used as the spatial context.

Referring back to FIG. 10, next the computer may compute a temporal anomaly score (operation 1014). For example, for all the access points in a group, the computer may calculate a temporal benchmark for $m(AP_t, t_t)$, such as the median $b_{i,t}$, which is then used to calculate a temporal anomaly score for $m(AP_t, t_t)$, i.e., $TAS_{i,t}$. According to the assumption of the rarity of the anomalies, the temporal benchmark of an access point may represent the expected values for its target access-point KPI at the target time instant. Note that the temporal anomaly score may measure the deviation of a target access-point KPI sample to its temporal context, and thus it may serve as a measurement of how anomalous the target access-point KPI sample is in the temporal perspective or context.

Moreover, the computer may determine a spatial temporal anomaly score (operation 1016). For example, softmax may be used to 'squash' a K-dimensional vector of arbitrary real values to a K-dimensional vector of probability-like real values in the range (0, 1) that add up to 1. Note that softmax has the property that, when it is applied to a vector of real values, it highlights the largest values and suppress values which are significantly below the maximum value. Because of this property, the target access-point KPI sample $m(AP_t, t_t)$ may need to meet two conditions in order to obtain a large spatial temporal anomaly score. First, its temporal anomaly score $TAS_{i,t}$ may need to be one of the largest within its spatial context. Second, the temporal anomaly scores within its spatial context may need to be significantly below $TAS_{t,t}$. This may ensure that a target access-point KPI sample is marked as anomalous only when it has a significant temporal anomaly that cannot be explained by normal system dynamics, i.e., variations of environmental factors. This is because temporal anomalies caused by normal system dynamics would lead to similar temporal anomaly scores for all the access points in the spatial context, and thus would prevent the target access-point KPI sample from having a large spatial temporal anomaly score. In general, softmax may allocate more weights to the largest values when the dynamic range of the input increases. Therefore, the temporal anomaly scores may need to be properly scaled (e.g., using a logarithm) before applying the softmax function in order to avoid overemphasizing the largest temporal anomaly scores.

Furthermore, the computer may determine if an anomaly happened (operation 1018). If yes, the computer may mark m($AP_t$, $t_r$) as anomalous (operation 1020), and if not the computer may mark m($AP_t$, $t_r$) as non-anomalous (operation 1022).

For example, the ratio $1/|S_t|$ may represent the spatial temporal anomaly score of the target access-point KPI in embodiments where all the access points in the spatial context have the same temporal anomaly score, and thus the temporal anomalies can be explained by the normal system dynamics. Consequently, a spatial temporal anomaly score that is larger than $1/|S_t|$ may represent a temporal anomaly that is not fully due to the normal system dynamics. Note that the selection of parameter η may depend on the temporal stationarity of the target access-point KPI. In particular, a larger value of η may be used when the target access-point KPI has more erratic temporal fluctuations. Moreover, note that a tradeoff between miss detections and false alarms can be achieved based on the selected η. For example, a larger value of η may result in a higher probability of miss detection and a lower probability of false alarm, while a smaller value of η may result in a lower probability of miss detection and a higher probability of false alarm.

In these ways, the detection technique may provide a generic framework for anomaly detection of various access-point KPIs in Wi-Fi networks. Moreover, the detection technique may include both the temporal and spatial contexts of the target access-point KPI samples. Therefore, the detection technique may be able to identify the true anomalies that cannot be explained by normal system dynamics. Furthermore, the detection technique may not require labeled data for training/validation. Additionally, the detection technique may identify anomalies without using fixed thresholds. This may make the detection technique robust against variations in the environmental factors.

Figure 12:
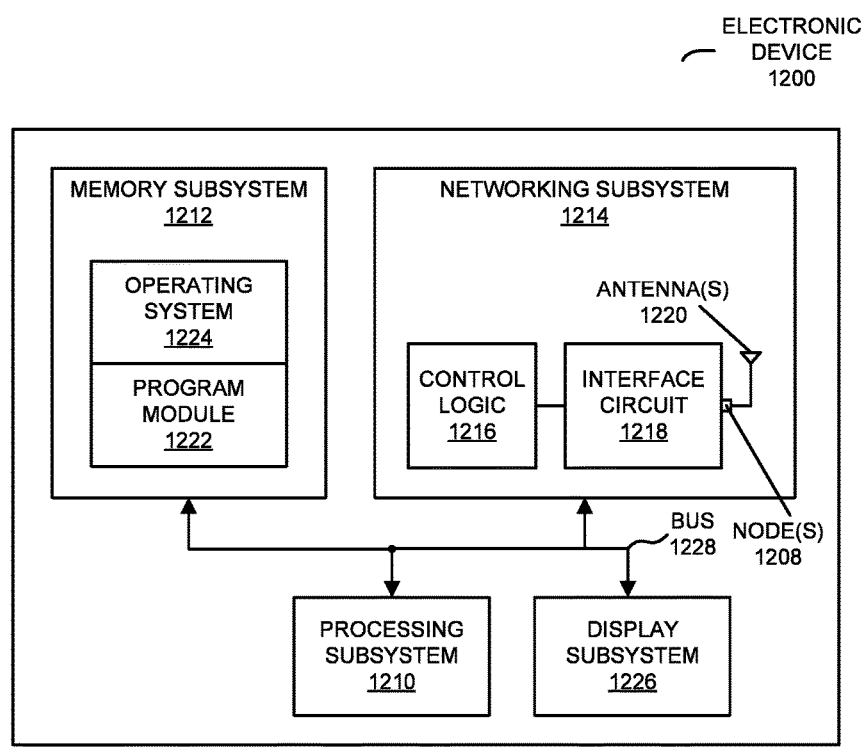
FIG. 12 is a block diagram illustrating an electronic device in accordance with an embodiment of the present disclosure.

We now describe embodiments of an electronic device, which may perform at least some of the operations in the communication technique. FIG. 12 presents a block diagram illustrating an electronic device 1200 in accordance with some embodiments, such as one of access points 110, one of electronic devices 112 or computer 122. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, ASICs, microcontrollers, programmable-logic devices, and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), and/or other types of memory. In some embodiments, instructions for processing subsystem 1210 in memory subsystem 1212 include: one or more program modules or sets of instructions (such as program module 1222 or operating system 1224), which may be executed by processing subsystem 1210. Note that the one or more computer programs may constitute a computer-program mechanism. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Networking subsystem 1214 includes one or more devices configured to couple to and communicate on a wired and/or wireless network (i.e., to perform network operations), including: control logic 1216, an interface circuit 1218 and one or more antennas 1220 (or antenna elements). (While FIG. 12 includes one or more antennas 1220, in some embodiments electronic device 1200 includes one or more nodes, such as nodes 1208, e.g., a pad, which can be coupled to the one or more antennas 1220. Thus, electronic device 1200 may or may not include the one or more antennas 1220.) For example, networking subsystem 1214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 1200 may be adapted or changed using pattern shapers (such as reflectors) in one or more antennas 1220 (or antenna elements), which can be independently and selectively electrically coupled to ground to steer the transmit antenna pattern in different directions. Thus, if one or more antennas 1220 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1200 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices as described previously.

Within electronic device 1200, processing subsystem 1210, memory subsystem 1212, and networking subsystem 1214 are coupled together using bus 1228. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the subsystems.

In some embodiments, electronic device 1200 includes a display subsystem 1226 for displaying information on a display, which may include a display driver and the display, such as a liquid-crystal display, a multi-touch touchscreen, etc.

Electronic device 1200 can be (or can be included in) any electronic device with at least one network interface. For example, electronic device 1200 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program module 1222 is included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. The integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1222, operating system 1224 (such as a driver for interface circuit 1218) or in firmware in interface circuit 1218. Alternatively or additionally, at least some of the operations in the communication technique may be implemented in a physical layer, such as hardware in interface circuit 1218.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
an interface circuit configured to communicate with access points in a network;
a processor coupled to the interface circuit; and
memory, coupled to the processor, which stores program instructions that, when executed by the processor, causes the computer to:
monitor values of at least one performance metric associated with packet communication by the access points;
compare current values of the performance metric for the access points with historical values of the performance metric for the access points within a temporal context in order to determine temporal anomaly scores for the access points, wherein the temporal context comprises one of: a target time, a time interval, and a sequence of time intervals;
compare the temporal anomaly scores of a group of access points in order to determine spatial temporal anomaly scores for the access points that indicate a significance of the temporal anomaly scores in a spatial context, wherein the spatial context comprises access points that: have environments with a common characteristic, or have approximately the same response to a change in an environmental factor;
when a spatial temporal anomaly score for an access point meets a detection criterion, identify the current value of the performance metric for the access point as an anomaly; and
perform a remedial action based at least in part on the identified anomaly.

2. The computer of claim 1, wherein the performance metric comprises one of: a received signal strength (RSSI), a throughput, and a packet error rate.

3. The computer of claim 1, wherein the performance metric is based at least in part on a set of measurements and a statistical analysis technique.

4. The computer of claim 1, wherein, when executed by the processor, the program instructions further causes the computer to identify, prior to comparing the temporal anomaly scores of the group of access points, the group of access points using an unsupervised learning technique.

5. The computer of claim 1, wherein the remedial action comprises one of: providing a notification associated with the anomaly, updating firmware of the access point, rebooting the access point, and providing another type of feedback to the access point.

6. A computer, comprising:
an interface circuit configured to communicate with access points in a network;
a processor coupled to the interface circuit and
memory, coupled to the processor, which stores program instructions module that, when executed by the processor, causes the computer to:
monitor values of at least one performance metric associated with packet communication by the access points;
compare current values of the performance metric for the access points with historical values of the performance metric for the access points within a temporal context in order to determine temporal anomaly scores for the access points;
compare the temporal anomaly scores of a group of access points in order to determine spatial temporal anomaly scores for the access points that indicate a significance of the temporal anomaly scores in a spatial context
when a spatial temporal anomaly score for an access point meets a detection criterion, identify the current value of the performance metric for the access point as an anomaly; and
perform a remedial action based at least in part on the identified anomaly, wherein comparing a current value of the performance metric for a given access point with the historical values of the performance metric of the given access point comprises at least one of: computing a logarithm of a ratio of the current value of the performance metric for the given access point with the historical values of the performance metric of the access point, determining a p-value of the current value of the performance metric for the given access point based at least in part von the historical values of the performance metric of the access point, and determining a confidence interval of the current value of the performance metric for the access point based at least in part on the historical values of the performance metric of the given access point.

7. The computer of claim 1, wherein comparing the current values of the performance metric for the access points with the historical values of the performance metric for the access points within the temporal context comprises comparing the current values of the performance metric with a repetitive variation of the historical values of the performance metric as a function of time.

8. A non-transitory computer-readable storage medium for use in conjunction with a computer, the computer-readable storage medium storing program instructions that, when executed by the computer, causes the computer to:
monitor values of at least one performance metric associated with packet communication by the access points;
compare current values of the performance metric for the access points with historical values of the performance metric for the access points within a temporal context in order to determine temporal anomaly scores for the access points, wherein the temporal context comprises one of: a target time, a time interval, and a sequence of time intervals;
compare the temporal anomaly scores of a group of access points in order to determine spatial temporal anomaly scores for the access points that indicate a significance of the temporal anomaly scores in a spatial context, wherein the spatial context comprises access points that: have environments with a common characteristic, or have approximately the same response to a change in an environmental factor;
when a spatial temporal anomaly score for an access point meets a detection criterion, identify the current value of the performance metric for the access point as an anomaly; and perform a remedial action based at least in part on the identified anomaly.

9. The computer-readable storage medium of claim 8, wherein the performance metric comprises one of: a received signal strength (RSSI), a throughput, and a packet error rate.

10. The computer-readable storage medium of claim 8, wherein the performance metric is based at least in part on a set of measurements and a statistical analysis technique.

11. The computer-readable storage medium of claim 8, wherein, when executed by the processor, the program instructions further causes the computer to identify, prior to comparing the temporal anomaly scores of the group of access points, the group of access points using an unsupervised learning technique.

12. The computer-readable storage medium of claim 8, wherein the remedial action comprises one of: providing a notification associated with the anomaly, updating firmware of the access point, rebooting the access point, and providing another type of feedback to the access point.

13. A method for identifying an anomaly, comprising:
by a computer:
monitoring values of at least one performance metric associated with packet communication by the access points;
comparing current values of the performance metric for the access points with historical values of the performance metric for the access points within a temporal context in order to determine temporal anomaly scores for the access points, wherein the temporal context comprises one of: a target time, a time interval, and a sequence of time intervals;
comparing the temporal anomaly scores of a group of access points in order to determine spatial temporal anomaly scores for the access points that indicate a significance of the temporal anomaly scores in a spatial context, wherein the spatial context comprises access points that: have environments with a common characteristic, or have approximately the same response to a change in an environmental factor;
when a spatial temporal anomaly score for an access point meets a detection criterion, identifying the current value of the performance metric for the access point as an anomaly; and
performing a remedial action based at least in part on the identified anomaly.

14. The method of claim 13, wherein the temporal context comprises one of: a target time, a time interval, and a sequence of time intervals.

15. The method of claim 13, wherein the group of access points comprises access points that: have environments with a common characteristic, are geographically proximate to each other, or have approximately the same response to a change in an environmental factor.

16. The method of claim 13, wherein the remedial action comprises one of: providing a notification associated with the anomaly, updating firmware of the access point, rebooting the access point, and providing another type of feedback to the access point.

17. The method of claim 13, wherein the method comprises identifying, prior to comparing the temporal anomaly scores of the group of access points, the group of access points using an unsupervised learning technique.

18. The method of claim 13, wherein the remedial action comprises one of: providing a notification associated with the anomaly, updating firmware of the access point, rebooting the access point, and providing another type of feedback to the access point.

19. The method of claim 13, wherein comparing a current value of the performance metric for a given access point with the historical values of the performance metric of the given access point comprises at least one of: computing a logarithm of a ratio of the current value of the performance metric for the given access point with the historical values of the performance metric of the access point, determining a p-value of the current value of the performance metric for the given access point based at least in part von the historical values of the performance metric of the access point, and determining a confidence interval of the current value of the performance metric for the access point based at least in part on the historical values of the performance metric of the given access point.

20. The computer-readable storage medium of claim 8, wherein comparing a current value of the performance metric for a given access point with the historical values of the performance metric of the given access point comprises at least one of: computing a logarithm of a ratio of the current value of the performance metric for the given access point with the historical values of the performance metric of the access point, determining a p-value of the current value of the performance metric for the given access point based at least in part von the historical values of the performance metric of the access point, and determining a confidence interval of the current value of the performance metric for the access point based at least in part on the historical values of the performance metric of the given access point.

* * * * *